United States Patent
Boggy et al.

(10) Patent No.: US 6,930,822 B2
(45) Date of Patent: Aug. 16, 2005

(54) WAVELENGTH LOCKER

(75) Inventors: Richard Boggy, Sunnyvale, CA (US); Kevin Holsinger, Menlo Park, CA (US); Dixon Kwok Chung, San Bruno, CA (US)

(73) Assignee: Spectra Physics, Inc., Mountain View, CA (US)

( * ) Notice: Subject to any disclaimer, the term of this patent is extended or adjusted under 35 U.S.C. 154(b) by 117 days.

(21) Appl. No.: 10/301,503

(22) Filed: Nov. 20, 2002

(65) Prior Publication Data

US 2003/0123131 A1 Jul. 3, 2003

Related U.S. Application Data

(60) Provisional application No. 60/331,967, filed on Nov. 20, 2001.

(51) Int. Cl.[7] .............................. G02F 1/39; H01S 3/13
(52) U.S. Cl. .................... 359/330; 372/29.022; 372/32; 372/99; 372/107
(58) Field of Search ................... 359/326–330; 372/29.02, 29.022, 32, 99, 107

(56) References Cited

U.S. PATENT DOCUMENTS

| | | | |
|---|---|---|---|
| 4,583,228 A | 4/1986 | Brown | 372/32 |
| 4,932,030 A | 6/1990 | Chung | 372/32 |
| 4,955,027 A | 9/1990 | Piper | 372/18 |
| 5,017,806 A | 5/1991 | Edelstein | 307/428 |
| 5,495,362 A | 2/1996 | Takatu et al. | 359/333 |
| 5,680,246 A | 10/1997 | Takahashi et al. | 359/341 |
| 5,809,048 A | 9/1998 | Shichijyo et al. | 372/32 |
| 6,101,211 A * | 8/2000 | Wakabayashi et al. | 372/102 |
| 6,393,037 B1 | 5/2002 | Basting | 372/20 |

FOREIGN PATENT DOCUMENTS

| | | | | |
|---|---|---|---|---|
| JP | 63028091 A | 2/1988 | | H01S/3/139 |
| JP | 63-028091 * | 2/1988 | | H01S/3/139 |
| WO | WO 99/45612 | 9/1999 | | H01S/3/082 |

* cited by examiner

*Primary Examiner*—John D. Lee
(74) *Attorney, Agent, or Firm*—Paul Davis; Heller Ehrman

(57) ABSTRACT

Wavelength stability of an optical oscillator has been enhanced by feedback from an external position-sensing detector to control the position or tilt of an intracavity optical element, such as a mirror. The wavelength stability results from stabilization of the intracavity beam position relative to an aperture in the oscillator. The wavelength selectivity of the aperture results from incorporation of a dispersive element in the oscillator cavity that produces a mapping of wavelength to beam position at the aperture.

58 Claims, 3 Drawing Sheets

WAVELENGTH LOCKER

CROSS-REFERENCE TO RELATED APPLICATIONS

This application claims the benefit of U.S. Ser. No. 60/331,967, filed Nov. 20, 2001, which application is fully incorporated herein by reference.

BACKGROUND

1. Field of the Invention

This invention relates generally to optical oscillators, and more particularly to optical oscillators where the intracavity beam is maintained at a fixed position within an intracavity optical system to maintain wavelength stability of the output beam.

2. Description of the Related Art

Accordingly, what is needed is a system and method for providing a cost-effective-wavelength locker to stabilize the wavelength of an optical oscillator, such as a tunable laser or optical parametric oscillator. The wavelength locker produced should be reliable and stable over a range of temperatures.

One way of accomplishing wavelength stabilization is by use of feedback from a reference to control a wavelength-tuning element inside the optical oscillator. This tuning may be accomplished by temperature control of a gain medium, by adjustment of temperature or angular tilt or spacing of an intracavity etalon, by adjusting the angle of a prism, a grating, a mirror, or a birefringent filter, by adjusting the position of a coated tuning wedge to control the spacing of the equivalent etalon seen by the cavity, or by adjustment of the cavity length, or other suitable means. All of these approaches can be used in combination with feedback from an external reference spectrometer, an external reference interferometer or etalon, an atomic or molecular absorption line, or other suitable means. In this invention, the wavelength reference is already built into the optical oscillator, and stabilization of the wavelength is achieved by stabilization of the beam path relative to the internal reference. This internal reference includes wavelength dispersive optical elements and a slit, components that could also be used to create an external spectrometer.

Another way to accomplish wavelength stabilization is to injection-seed the oscillator with a beam from another oscillator that operates with a stable wavelength. This is commonly done in pulsed lasers to achieve narrow linewidth wavelength stabilized operation through injection seeding by a low power cw laser beam. The laser pulse is initiated by amplification of the narrow band light provided by the seed laser rather than being initiated by spontaneous emission within the gain medium. U.S. Pat. No. 4,955,027 (Wavelength Locked Laser Light Source) by Piper at el, describes a system in which laser output wavelength stability is enhanced through such an injection-seeding process.

In U.S. Pat. No. 5,809,048 (Wavelength Stabilized Light Source) by Shichijyo et al, a means of providing wavelength filtered optical feedback (using a birefringent Lyot filter) to a semiconductor laser is described as producing improved wavelength stability. This is an example of direct feedback from an external wavelength sensitive optical device to lock the wavelength of the oscillator, a type of injection seeding in which the injected signal is derived from the filtered output of the laser to be controlled.

In U.S. Pat. No. 4,583,228 (Frequency Stabilization of Lasers) by Brown et al, the wavelength stabilization of a semiconductor laser is based on a feedback signals derived from an external Fabry-Perot interferometer that were used to control both the drive current and the laser temperature. This is an example of electronic feedback that is derived from an external wavelength-sensing optical device. Electonic control is applied to critical laser parameters to control the wavelength.

In U.S. Pat. No. 6,393,037 (Wavelength Selector for Laser with Adjustable Angular Dispersion) by Basting et al, the wavelength and linewidth of a laser are controlled by use of signals generated in a linewidth and wavelength-monitoring unit, which samples the laser output beam. Control is provided through use of a signal processor that can direct prisms to rotate within the laser to change refraction angles to change laser wavelength and linewidth. This has some similarity to the invention described here in that both rely on stabilization or control by means of movement of an optical element.

In U.S. Pat. No. 5,017,806 (Broadly Tunable High Repetition Rate Femtosecond Optical Parametric Oscillator) by Edelstein et al, a synchronously pumped OPO (optical parametric oscillator) that can produce femtosecond light pulses is described. The output wavelength of the OPO is held stable by a feedback loop that controls the length of the OPO cavity. The feedback is derived from detectors that monitor the direction of shift of the output spectrum. Because the performance of such an OPO also depends on the wavelength stability of the mode-locked pump laser, it can clearly benefit from application of the present invention to stability of the pump laser wavelength.

In U.S. Pat. No. 4,932,030 (Frequency Stabilization of Long Wavelength Semiconductor Laser via Optogalvanic Effect) by Chung, wavelength stabilization is achieved by locking the output wavelength of a laser to a transition in an atomic absorber excited in an electrical discharge. In this case, the feedback loop used to control the laser was responding to an optogalvanic signal derived by means of dithering lock-in techniques.

The present invention differs from the techniques mentioned above in that the wavelength reference is located within the oscillator rather than externally, and the wavelength stability derives from feedback from an external position-sensing detector to maintain the intracavity beam position relative to the reference.

A convenient application of the present invention is in an ultra-short-pulse laser that already utilizes prisms to provide dispersion compensation that is necessary for production of the ultra short pulses, especially for pulses shorter than one picosecond in duration. In this case the prism sequence that is used for dispersion compensation can also be used as the wavelength reference needed for the stabilization of the output wavelength. Pulses as short as 100 femtoseconds in duration can only be produced if the laser spectrum has more than 6 nm of bandwidth (the full width at half maximum of the spectral spread of the laser output beam). In this case, the output wavelength can be defined as the wavelength halfway between the half-maximum wavelengths, and that is the wavelength that is kept stable against environmental changes by application of the invention.

Such a wavelength stabilized laser system would have applications to pumping of an optical parametric oscillator (angle-tuned, temperature-tuned, or wavelength-tuned), to creation of harmonics in non-linear crystals by processes that have phase-matching sensitivity (angle-tuned or temperature-tuned, for example), and to seeding of amplifier systems such as regenerative chirp-pulse amplifiers, for which stability of the amplified pulse is critically dependent on stability of the seed pulse wavelength. In addition, such lasers have applications to scanning microscopy systems for which enhanced wavelength stability is desirable for examination of samples that have wavelength sensitivity.

SUMMARY

Accordingly, an object of the present invention is to provide an optical oscillator system that has improved wavelength stability of the output beam.

Another object of the present invention is to provide an optical oscillator system where the intracavity beam is maintained at a fixed position to maintain wavelength stability of the output beam.

These and other objects of the present invention are achieved in an optical oscillator system with an end mirror and an output coupler that define a resonator cavity for an intracavity beam. The resonator cavity produces an output beam with selected spectral components. A gain medium is positioned in the resonator cavity. An aperture member is positioned in the resonator cavity in a path of the intracavity beam. The aperture member defines an aperture that provides a low loss intracavity beam path for a range of spectral components. A dispersion member with first and second sides is positioned in the resonator cavity. When the intracavity beam travels from the first side to the second side the dispersion member creates a spatial spread process of the range of spectral components. From the second side to the first side the process is reversed. A movably mounted mirror is included. In response to a feedback signal the movably mounted mirror maintains the output beam at a same position at the output coupler.

In another embodiment of the present invention, an end mirror and an output coupler define a resonator cavity for an intracavity beam that produces an output beam with selected spectral components. A gain medium is positioned in the resonator cavity. An aperture member is positioned in the resonator cavity in a path of the intracavity beam. The aperture member defines an aperture that provides a low loss intracavity beam path for a range of spectral components. A first prism pair has first and second sides and is positioned between the aperture member and the output coupler. When the intracavity beam travels from the first side to the second side the first prism pair creates a spatial spread process of the range of spectral components. From the second side to the first side the process is reversed. A movably mounted mirror is included. In response to a feedback signal the movably mounted mirror maintains the output beam at a same position at the output coupler.

In another embodiment of the present invention, an optical oscillator system includes an end mirror and an output coupler that define a resonator cavity for an intracavity beam. The resonator cavity produces an output beam with selected spectral components. A gain medium is positioned in the resonator cavity. A first prism pair has first and second sides and is positioned in the resonator cavity. A second prism pair has first and second sides and is positioned between the first prism pair and the output coupler. An aperture member is positioned between the first and second prism pairs in a path of the intracavity beam. The aperture member defines an aperture to create a path for the output beam. A movably mounted mirror is included. In response to a feedback signal the movably mounted mirror maintains the output beam at a same position at the output coupler. When the intracavity beam travels from the first side to the second side of the second prism pair, the second prism pair creates a spatial spread process of the spectral components. When traveling from the first side to the second side of the first prism pair, the first prism pair reverses the process.

DETAILED DESCRIPTION OF THE PREFERRED EMBODIMENTS

In various embodiments, the present invention is an optical oscillator system, including but not limited to a laser system, build up cavity, OPO, amplifier system and the like. Examples of laser systems include but are not limited to Ti:sapphire lasers, and the like.

Figure 1:
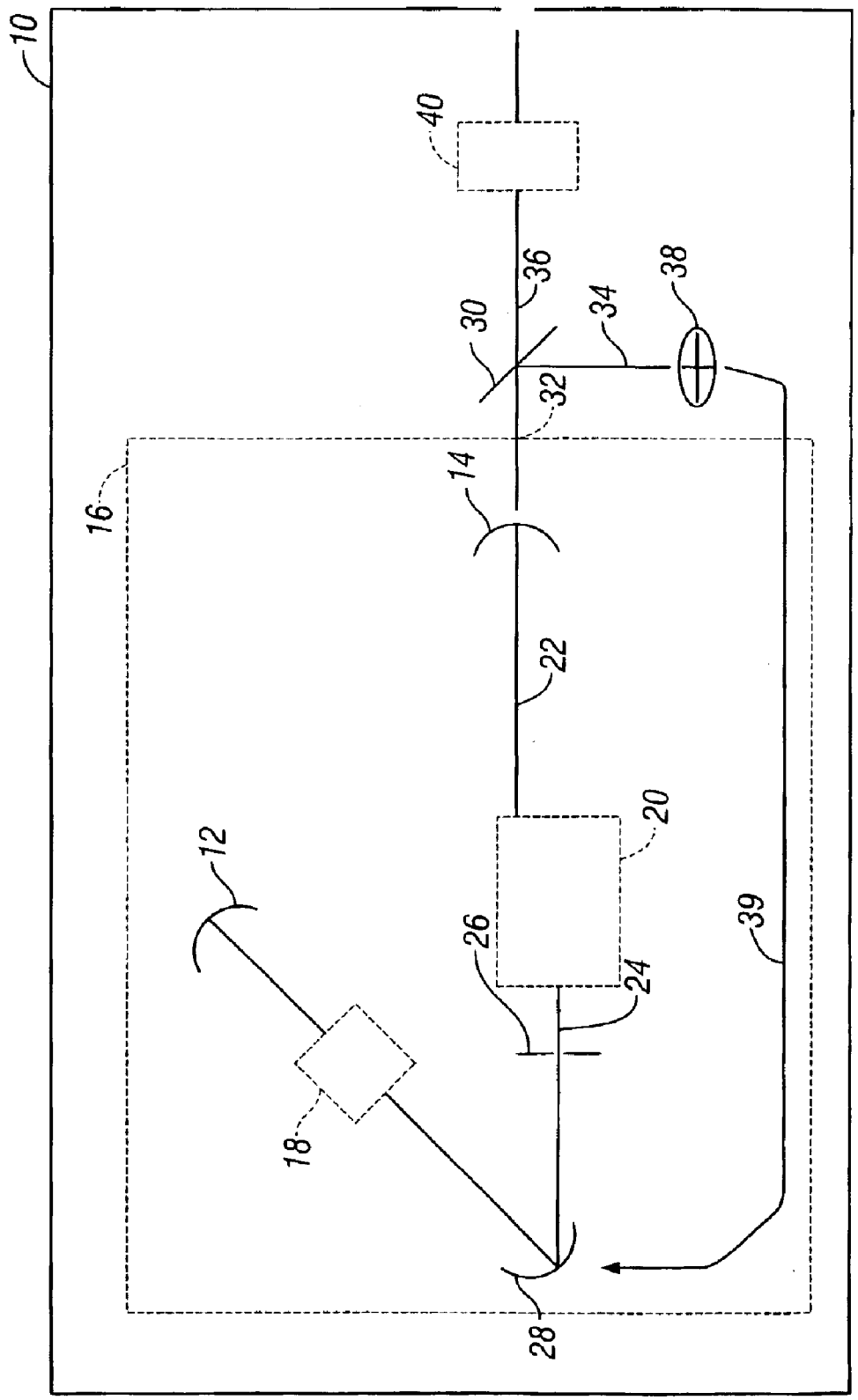
FIG. 1 is a schematic diagram of one embodiment of an optical oscillator system of the present invention that includes a dispersion device.

Referring to FIG. 1, one embodiment of an optical oscillator system 10 of the present invention includes an end mirror 12 and an output coupler 14 that generally define a resonator cavity 16. Output coupler 14 can be curved or flat. Resonator cavity 16 produces an output beam with selected spectral components.

A gain medium 18 is positioned in resonator cavity 16. A dispersion member 20 is positioned in resonator cavity 16. Dispersion member 20 creates a spread of spectral components of the intracavity beam in a lateral direction. Dispersion member 20 can be a variety of optical elements including but not limited to a grating pair, and the like.

An aperture member 26 is positioned in resonator cavity 16 in a path of the intracavity beam. Aperture member 26 defines an aperture that provides a low loss intracavity beam path for a range of spectral components. At first position 22, the range of spectral components of the intracavity beam follows a single beam path. When the intracavity beam travels from position 22 to position 24, dispersion member 20 creates a spatial spread of the range of spectral components. When the intracavity beam travels from position 24 to position 22, the reverse process occurs.

A movably mounted mirror 28 is provided. In response to feedback, a signal, movably mounted mirror 28 maintains the output beam at a same position at output coupler 14. Movably mounted mirror 28 can be rotatably mounted. A variety of different mechanisms can be used to mount mounted mirror 28 including but not limited to the use of a piezoelectric device, and the like. Movably mounted mirror 28 holds the intracavity beam at a fixed position relative to the aperture to maintain a stable wavelength of the output beam. Movably mounted mirror 28 can be positioned between the aperture member 26 and end mirror 12.

Aperture member 26 blocks non-selected spectral components of the intracavity beam that are incident on gain medium 18. Aperture member 26 has an aperture that passes the selected spectral components that are reflected from end mirror 12, and oscillate in resonator cavity 16. The non-selected spectral components do not pass through the aperture and do not oscillate in resonator cavity 16.

A beam splitter 30, or other suitable device, can be positioned at an exterior of resonator cavity 16 along a beam path 32 of the output beam, and creates first and second beams 34 and 36. A detector 38 is positioned along a beam path of beam 34. In response to the detection of beam 34, detector 38 produces a feedback signal 39 for movably mounted mirror 28. A variety of different detectors 38 can be utilized including but not limited to a position sensitive detector such as a quad detector, bi-cell detector, and the like.

Oscillator system 10 can also include a non-linear device 40 including but not limited to a frequency doubler. Additional fold mirrors and other optical components can be included, as illustrated in FIG. 1.

Figure 2:
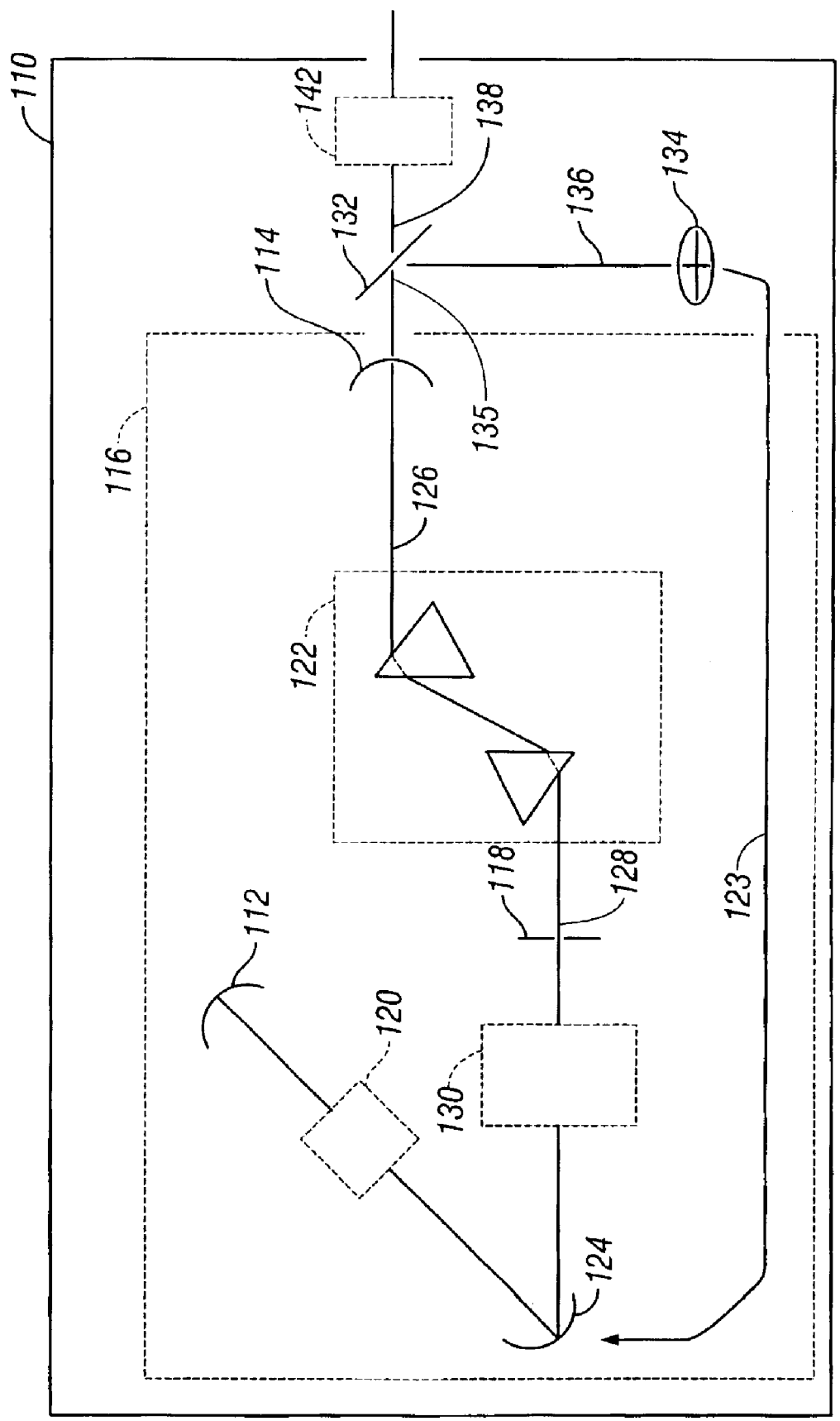
FIG. 2 is a schematic diagram of another embodiment of an optical oscillator system of the present invention with a prism pair.

With reference now to FIG. 2, another embodiment of the present invention is an optical oscillator system 110 with an end mirror 112 and an output coupler 114 that define a resonator cavity 116 for an intracavity beam that produces an output beam 118 of selected spectral components. A gain medium 120 is positioned in resonator cavity 116. An aperture member 118 is positioned in resonator cavity 118 in a path of the intracavity beam. Aperture member 118 has an aperture that provides a low loss intracavity beam path for a range of spectral components. A first prism pair 122 is positioned between aperture member 118 and output coupler 114. A movably mounted mirror 124 is provided. In response to a feedback signal 123, movably mounted mirror 124 maintains the output beam at a same position at output coupler 114.

At a first position 126, the range of spectral components of the intracavity beam follows a single beam path. When the intracavity beam travels from position 126 to position 128, first prism pair 122 creates a spatial spread of the range of spectral components. When the intracavity beam travels from position 128 to position 126, the reverse process occurs. Oscillator system 110 can include a retro-reflector 130, or suitable optical device.

A beam splitter 132 and a detector 134 are positioned at the exterior of resonator cavity 116. Again, beam splitter 132 splits the output beam 135 into beams 136 and 138. Detector 134 is positioned to along a path of beam 136. In response to beam 136, detector 132 produces the feedback signal 123 to movably mounted mirror 124. A non-linear device 138, including but not limited to a frequency doublers, can be included in optical oscillator system 110. Oscillator system 110 can include additional optical components.

Figure 3:
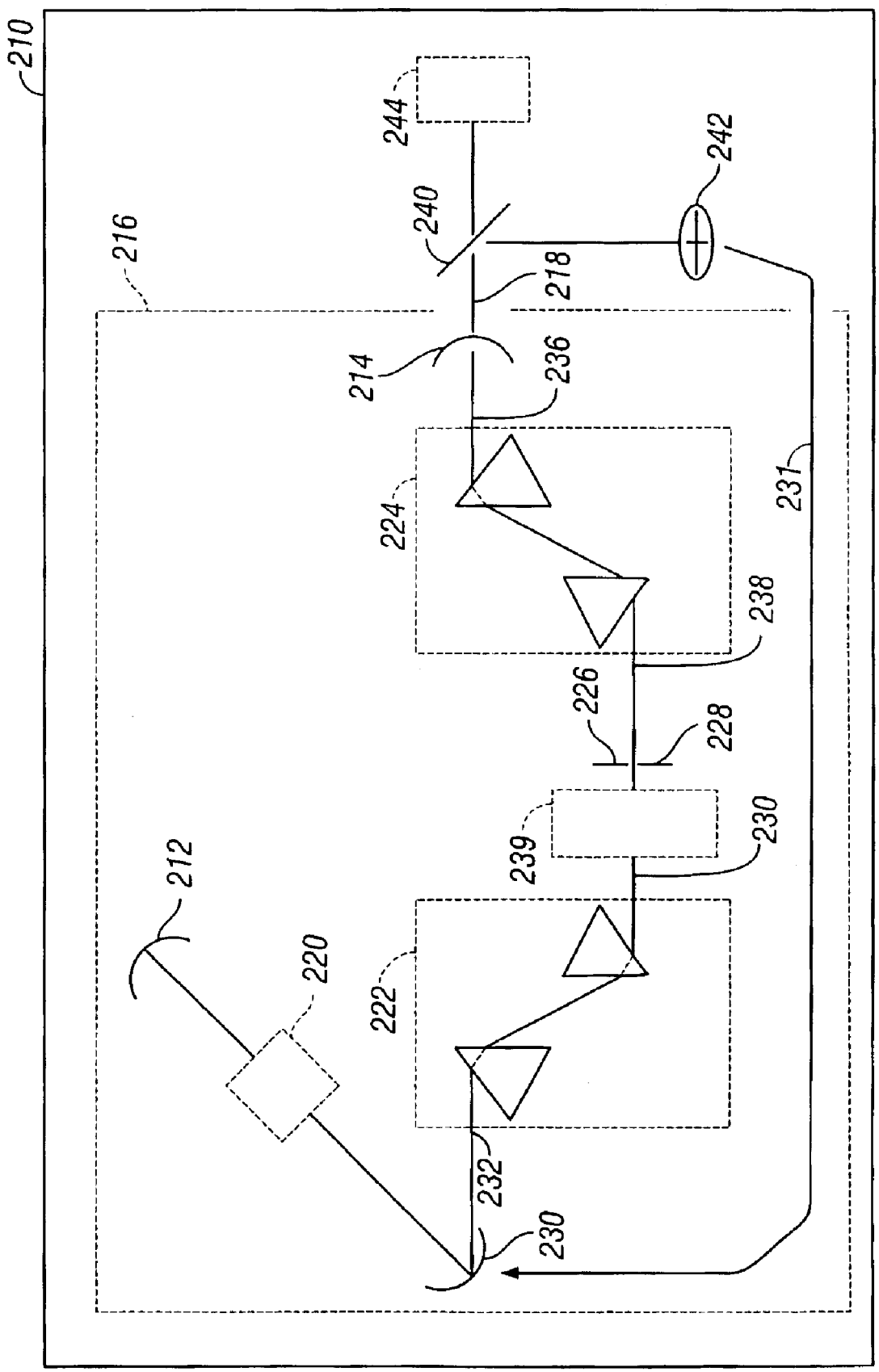
FIG. 3 is a schematic diagram of another embodiment of an optical oscillator system of the present invention with two prism pairs.

In another embodiment of the present invention, illustrated in FIG. 3, an optical oscillator system 210 includes an end mirror 212 and an output coupler 214 that define a resonator cavity 216 for an intracavity beam. Resonator cavity 216 produces an output beam 218 with selected spectral components. A gain medium 220 is positioned in resonator cavity 216. A first prism pair 222 is positioned in resonator cavity 216. A second prism pair 224 is positioned between first prism pair 222 and output coupler 214. An aperture member 226 is positioned between first and second prism pairs 222 and 224 in a path 228 of the intracavity beam. Aperture member 226 defines an aperture that provides a low loss intracavity beam path for a range of spectral components. A movably mounted mirror 230 is provided. In response to a feedback signal 231, movably mounted mirror 230 maintains output beam 218 at a same position at output coupler 214. First prism pair 222 has first and second sides 230 and 232, and second prism pair 224 has first and second sides 236 and 238 respectively.

When the intracavity beam travels from first side 236 to second side 238, second prism pair 224 creates a spatial spread of the spectral components. When traveling from first side 230 to second side 232, first prism pair 222 reverses the process. A retro reflector 239, or other suitable optical device, can be included.

A beam splitter 240 and a detector 242 are positioned at the exterior of resonator cavity 216. Beam splitter 240 and detector 242 provide the some functions as beam splitters 30, 132 and detectors 38, 134, respectively. A non-linear device 244 can be included. Oscillator system 210 can include additional optical elements.

Gain medium 18, 120 and 220 can be made of a variety of different materials including but not limited to, Nd:YVO$_4$, Nd:YAG, Nd:YLF, Nd:Glass, Ti:sapphire, Cr:YAG, Cr:Forsterite, Yb:YAG, Yb:KGW, Yb:KYW, Yb:glass, KYbW, YbAG and the like. In one embodiment, the preferred gain medium is Nd:YVO$_4$ with a doping level of less than 0.5%.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

What is claimed is:

1. An optical oscillator system, comprising:
   an end mirror and an output coupler defining a resonator cavity for an intracavity beam and producing an output beam with selected spectral components;
   a gain medium positioned in the resonator cavity;
   an aperture member positioned in the resonator cavity in a path of the intracavity beam, the aperture member defining an aperture that provides a low loss intracavity beam path for a range of spectral components;
   a dispersion member with first and second sides and positioned in the resonator cavity, wherein when the intracavity beam travels from the first side to the second side along a path, the dispersion member creates a spatial spread of the range of spectral components, and when the intracavity beam travels from the second side to the first side along the path the process is reversed; and
   a movably mounted mirror, wherein in response to a feedback signal the movably mounted mirror moves to maintain the output beam at a same position at the output coupler, wherein the movably mounted mirror is positioned between the aperture member and the end mirror.

2. The system of claim 1, wherein the movably mounted mirror holds the intracavity beam at a fixed position relative to the aperture to maintain a stability of the output beam.

3. The system of claim 2, wherein the stability is a stability of output beam wavelengths.

4. The system of claim 1, wherein the oscillator system includes a non-linear device.

5. The system of claim 1, wherein the oscillator system includes a frequency doubler.

6. The system of claim 1, wherein the oscillator system is a laser system.

7. The system of claim 6 wherein the laser material is tunable.

8. The system of claim 1, wherein the oscillator system is an optically pumped laser.

9. The system of claim 1, wherein the oscillator system is a build up cavity.

10. The system of claim 1, wherein the oscillator system is tunable across a bandwidth of at least 100 nm.

11. The system of claim 1, wherein the oscillator system is an OPO.

12. The system of claim 1, wherein the oscillator system is a regenerative amplifier system.

13. The system of claim 12, wherein the oscillator system provides ultra short pulses of less than 100 femtoseconds.

14. The system of claim 1, wherein the dispersion member is a grating pair.

15. The system of claim 1, wherein the selected components are a band of wavelengths.

16. An optical oscillator system, comprising:
an end mirror and an output coupler defining a resonator cavity for an intracavity beam and producing an output beam with selected spectral components;
a gain medium positioned in the resonator cavity;
an aperture member positioned in the resonator cavity in a path of the intracavity beam, the aperture member defining an aperture that provides a low loss intracavity beam path for range of spectral components;
a dispersion member with first and second sides and positioned in the resonator cavity, wherein when the intracavity beam travels from the first side to the second side along a path, the dispersion member creates a spatial spread of the range of spectral components, and when the intracavity beam travels from the second side to the first side along the path the process is reserved;
a movably mounted mirror, wherein in response to a feedback signal the movably mounted mirror moves to maintain the output beam at a same position at the output coupler
a beam splitter positioned at en exterior of the resonator cavity; and
a detector at the exterior of the resonator cavity and positioned to receive at least a portion of the output beam and produce the feedback for the movably mounted mirror.

17. The system of claim 16, wherein the detector is a bi-cell detector.

18. The system of claim 16, wherein the detector is a quad-cell detector.

19. The system of claim 16, wherein the detector is a position sensitive detector.

20. An optical oscillator system, comprising:
en end mirror and an output coupler defining a resonator cavity for an intracavity beam and producing an output beam with selected spectral components;
a gain medium positioned in the resonator cavity;
an aperture member positioned in the resonator cavity in a path of the intracavity beam, the aperture member defining an aperture that provides a low loss intracavity beam path for a range of spectral components;
a first prism pair with first and second sides and positioned between the aperture member and the output coupler, wherein when the intracavity beam travels from the first side to the second sidealong a path the first prism pair creates a spatial spread of the range of spectral components, and when the intracavity beam travels from the second side to the first side along the path the process is reversed; and
a movably mounted mirror, wherein in response to a feedback signal the movably mounted mirror moves to maintain the output beam at a same position at the output coupler.

21. The system of claim 20, wherein the movably mounted mirror holds the intracavity beam at a fixed position relative to the aperture to maintain a stability of the output beam.

22. The system of claim 21, wherein the stability is a stability of output beam wavelengths.

23. The system of claim 22, further comprising:
a retro-reflector.

24. The system of claim 20, wherein the movably mounted mirror is positioned between the aperture member and the end mirror.

25. The system of claim 20, wherein the aperture member blocks non-selected spectral components of an input beam that is incident on the gain medium.

26. The system of claim 20, further comprising:
a beam splitter positioned at an exterior of the resonator cavity; and
a detector at the exterior of the resonator cavity and positioned to receive at least a portion of the output beam and produce the feedback signal for the movably mounted mirror.

27. The system of claim 26, wherein the detector is a bi-cell detector.

28. The system or claim 26, wherein the detector is a quad-cell detector.

29. The system of claim 26, wherein the detector is a position sensitive detector.

30. The system of claim 20, wherein the oscillator system includes a frequency doubler.

31. The system of claim 30, wherein the oscillator system is an OPO.

32. The system of claim 20, wherein the gain medium is a nonlinear optical device.

33. The system of claim 20, wherein the gain medium is a laser material.

34. The system of claim 20, wherein the oscillator system is a build up cavity.

35. The system of claim 34, wherein the build up cavity includes at least two non-linear optical components.

36. The system of claim 20, wherein the oscillator system is a Ti:sapphire laser.

37. The system of claim 20, wherein the oscillator system is a regenerative amplifier system.

38. The system of claim 20, wherein the output coupler is curved.

39. The system of claim 20, wherein the selected components are a band of wavelengths.

40. An optical oscillator system, comprising;
an end mirror and an output coupler defining a resonator cavity for an intracavity beam and producing an output beam with selected spectral components;
a gain medium positioned In the resonator cavity;
a first prism pair with first and second sides and positioned in the resonator cavity;
a second prism pair with first and second sides and positioned between the first prism pair and the output coupler;
an aperture member positioned between the first and second prism pairs in a path of the intracavity beam, the aperture member defining an aperture to create the output beam;
a movably mounted mirror, in response to a feedback signal the movably mounted mirror maintains the output beam at a same position at the output coupler; and
wherein when the intracavity beam travels from the first side to the second side of the second prism pair, the second prism pair creates a spatial spread process of the spectral components, and when traveling from the first side to the second side of the first prism pair, the first prism pair reverses the process.

41. The system of claim 40, wherein the movably mounted mirror holds the intracavity beam at a fixed position relative to the aperture to maintain a stability of the output beam.

42. The system of claim 41, wherein the stability is a stability of output beam wavelengths.

43. The system of claim 40, wherein the movably mounted mirror is positioned between the aperture member and the end mirror.

44. The system of claim 40, wherein the aperture member blocks non-selected spectral components of an input beam that is incident on the gain medium.

45. The system of claim 40, further comprising:
   a beam splitter positioned at an exterior of the resonator cavity; and
   a detector at the exterior of the resonator cavity and positioned to receive at least a portion of the output beam and produce the feedback signal for the movably mounted mirror.

46. The system of claim 45, wherein the detector is a position sensitive detector.

47. The system of claim 45, wherein the detector is a quad detector.

48. The system of claim 45, wherein the detector is a bi-cell detector.

49. The system of claim 40, wherein the oscillator system includes a frequency doubler.

50. The system of claim 40, wherein the oscillator system is a laser system.

51. The system of claim 40, wherein the oscillator system is an optically pumped laser.

52. The system of claim 40, wherein the oscillator system is a build up cavity.

53. The system of claim 52, wherein the build up cavity includes non-linear optical components.

54. The system of claim 40, wherein the oscillator system is a Ti:sapphire laser.

55. The system of claim 40, wherein the oscillator system is an OPO.

56. The system of claim 40, wherein the oscillator system is an amplifier system.

57. The system of claim 40, wherein the output coupler is curved.

58. The system of claim 40, wherein the selected components are a band of wavelengths.

* * * * *